US009238888B2

(12) United States Patent
Backman et al.

(10) Patent No.: US 9,238,888 B2
(45) Date of Patent: Jan. 19, 2016

(54) METHOD FOR CLEANING CELLULOSE SUSPENSIONS

(71) Applicants: Jan Backman, Jarfalla (SE); Valentina Kucher, Stockholm (SE)

(72) Inventors: Jan Backman, Jarfalla (SE); Valentina Kucher, Stockholm (SE)

(73) Assignee: GL&V Luxembourg S.à r.l., Munsbach (LU)

( * ) Notice: Subject to any disclaimer, the term of this patent is extended or adjusted under 35 U.S.C. 154(b) by 0 days.

(21) Appl. No.: 14/727,766

(22) Filed: Jun. 1, 2015

(65) Prior Publication Data

US 2015/0259853 A1    Sep. 17, 2015

Related U.S. Application Data

(62) Division of application No. 13/380,923, filed as application No. PCT/SE2009/051009 on Sep. 10, 2009.

(30) Foreign Application Priority Data

Jul. 3, 2009    (SE) ...................................... 0900927

(51) Int. Cl.
  *B01D 21/26*    (2006.01)
  *D21D 5/24*    (2006.01)
  *B04C 5/081*    (2006.01)
  (Continued)

(52) U.S. Cl.
  CPC ................ *D21D 5/24* (2013.01); *B01D 21/267* (2013.01); *B03D 1/02* (2013.01); *B04C 5/081* (2013.01); *B04C 5/13* (2013.01); *B04C 5/26* (2013.01); *B04C 7/00* (2013.01)

(58) Field of Classification Search
  CPC ............... D21F 1/68; D21F 1/70; D21F 5/24; D21F 5/18; B03D 1/1431; B03D 1/02; B04C 5/04; B04C 5/12; B04C 5/13; B04C 7/00; B04C 9/00; B04C 2009/002; B04C 5/081; B04C 5/30; B04C 5/28; B04C 5/26; B01D 17/08; B01D 21/267; D21D 5/24
  See application file for complete search history.

(56) References Cited

U.S. PATENT DOCUMENTS 2,756,878 A * 7/1956 Herkenhoff ............. B04C 5/081
                                                       209/727
3,352,745 A * 11/1967 Malm ...................... D21B 1/02
                                                       162/142
(Continued)

FOREIGN PATENT DOCUMENTS

EP              1191141 A1 *  3/2002
WO    WO 91/00387 A1 *  1/1991  ............... D21D 5/24

OTHER PUBLICATIONS

English language machine translation of EP 1191141 A1, Generated on Jun. 16, 2015, pp. 1-10.*

*Primary Examiner* — David C Mellon

(57) ABSTRACT

The present invention concerns a hydrocyclone for cleaning cellulose suspensions from light impurities i.e. a so called reverse hydrocyclone, having a base end and an apex end and a separation chamber having an elongated shape between the base end and the apex end, at least one inlet arranged at the base end and at least one underflow outlet at the apex end and at least one overflow outlet at the base end. The overflow outlet is provided with an additional, light reject outlet arranged concentrically to a length axis of the hydrocyclone. The invention also concerns a system and a method for producing and/or treating cellulose suspension comprising at least a reverse cleaning stage and at least a dewatering stage.

11 Claims, 10 Drawing Sheets

(51) Int. Cl.
  *B04C 5/13* (2006.01)
  *B04C 7/00* (2006.01)
  *B03D 1/02* (2006.01)
  *B04C 5/26* (2006.01)

(56) References Cited

U.S. PATENT DOCUMENTS

| | | | | |
|---|---|---|---|---|
| 3,849,246 A | * | 11/1974 | Raymond | B03B 9/06 162/189 |
| 3,928,186 A | * | 12/1975 | Zemanek | B04C 5/081 209/725 |
| 4,773,989 A | * | 9/1988 | Pfalzer | B04C 5/24 209/725 |
| 4,983,258 A | * | 1/1991 | Maxham | 162/189 |
| 5,021,165 A | * | 6/1991 | Kalnins | B01D 17/0205 210/202 |
| 5,071,557 A | * | 12/1991 | Schubert et al. | 210/512.2 |
| 5,938,926 A | * | 8/1999 | McCarthy | 210/512.1 |
| 2004/0062879 A1 | * | 4/2004 | Bowman | D21B 1/12 428/2 |

\* cited by examiner

Prior Art

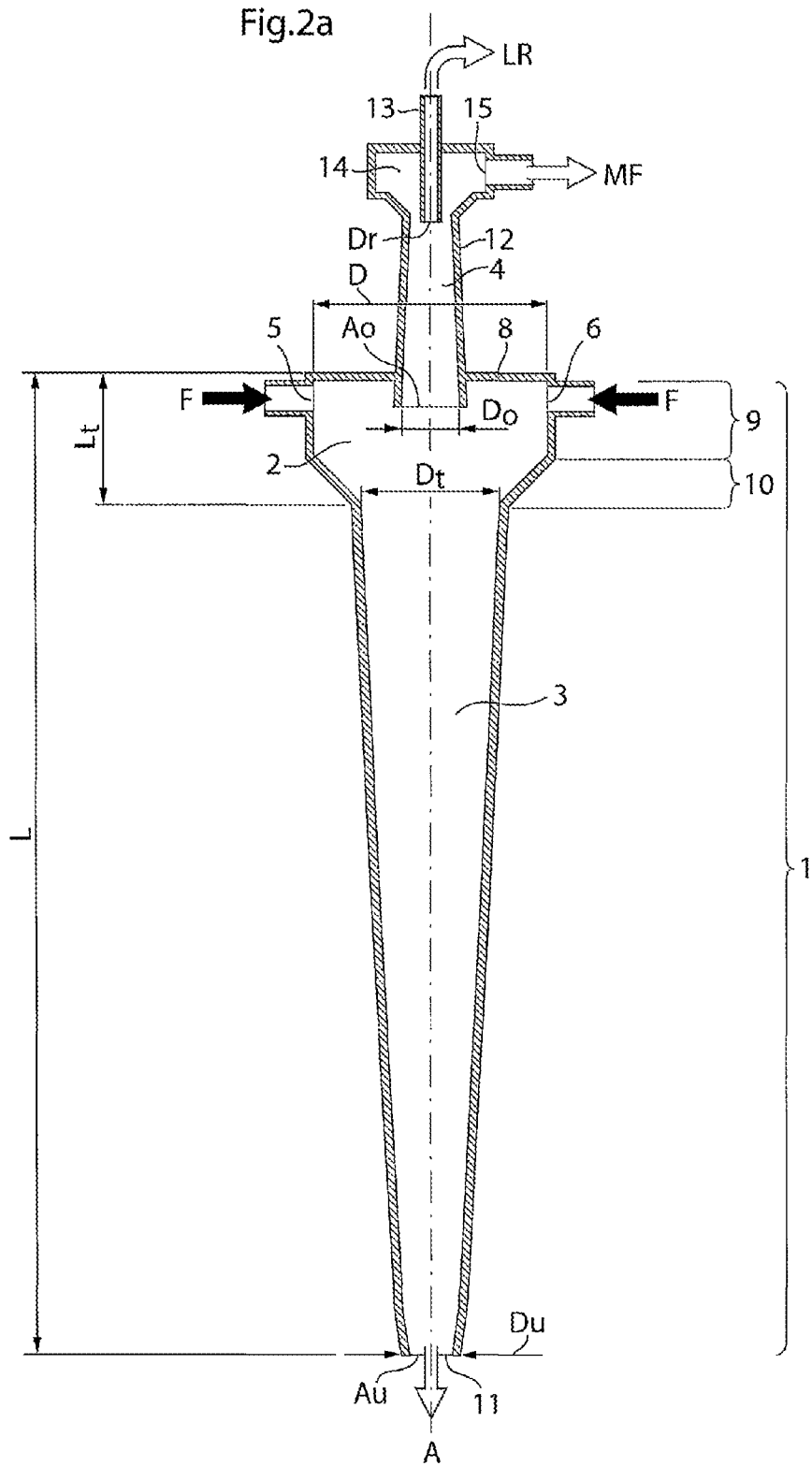

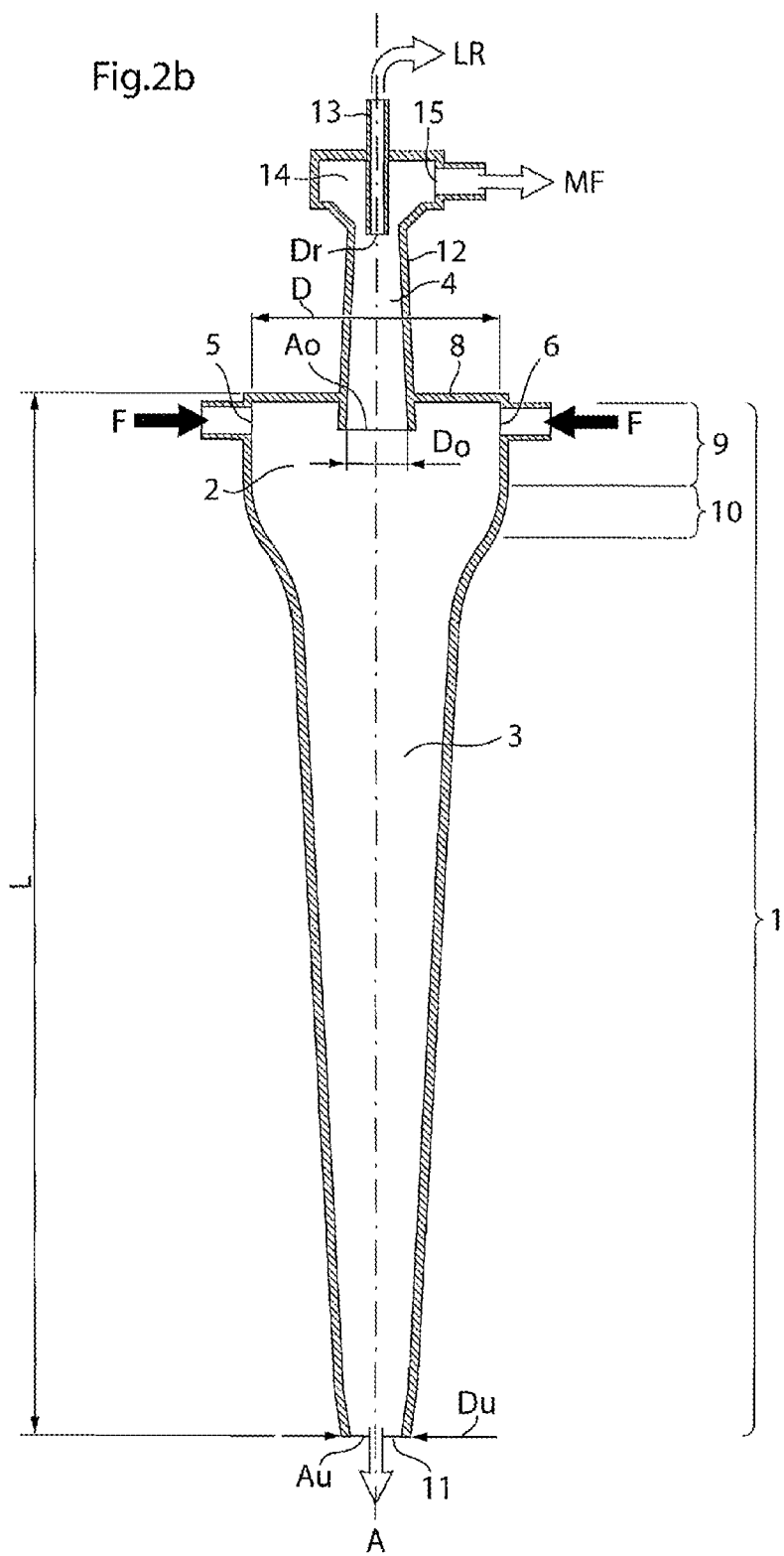

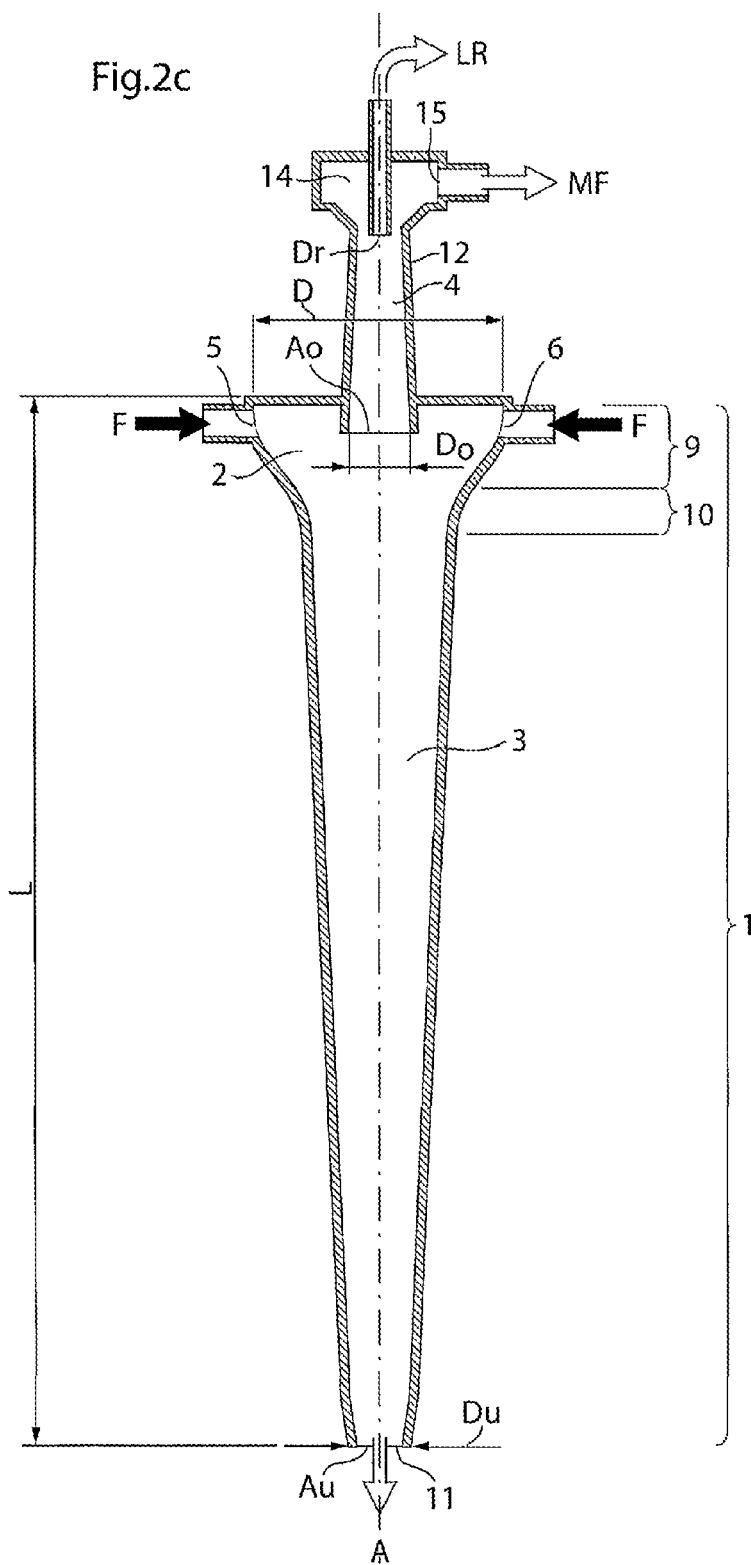

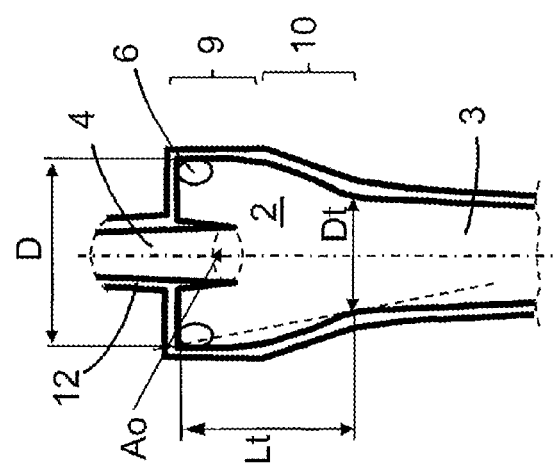

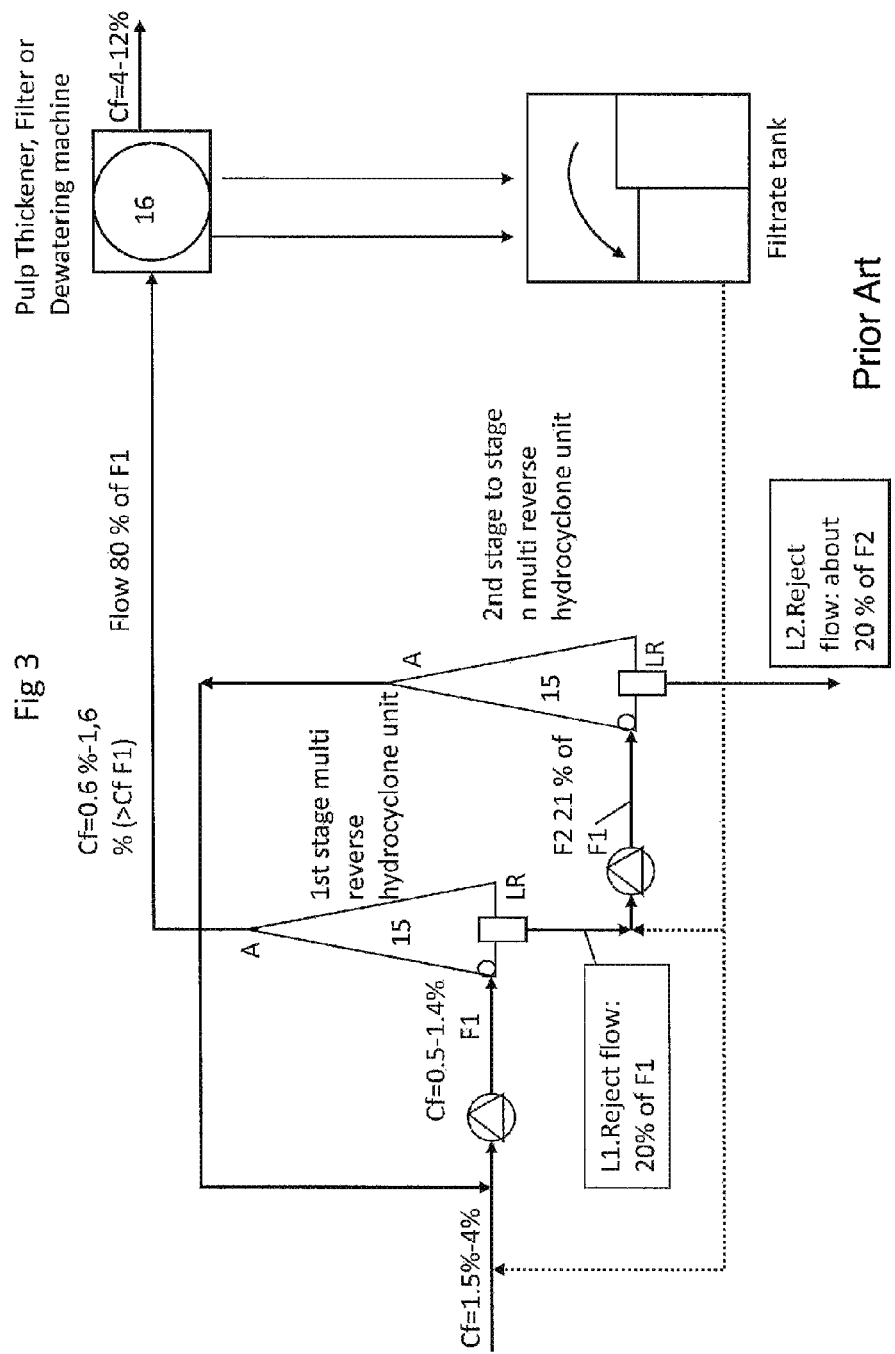

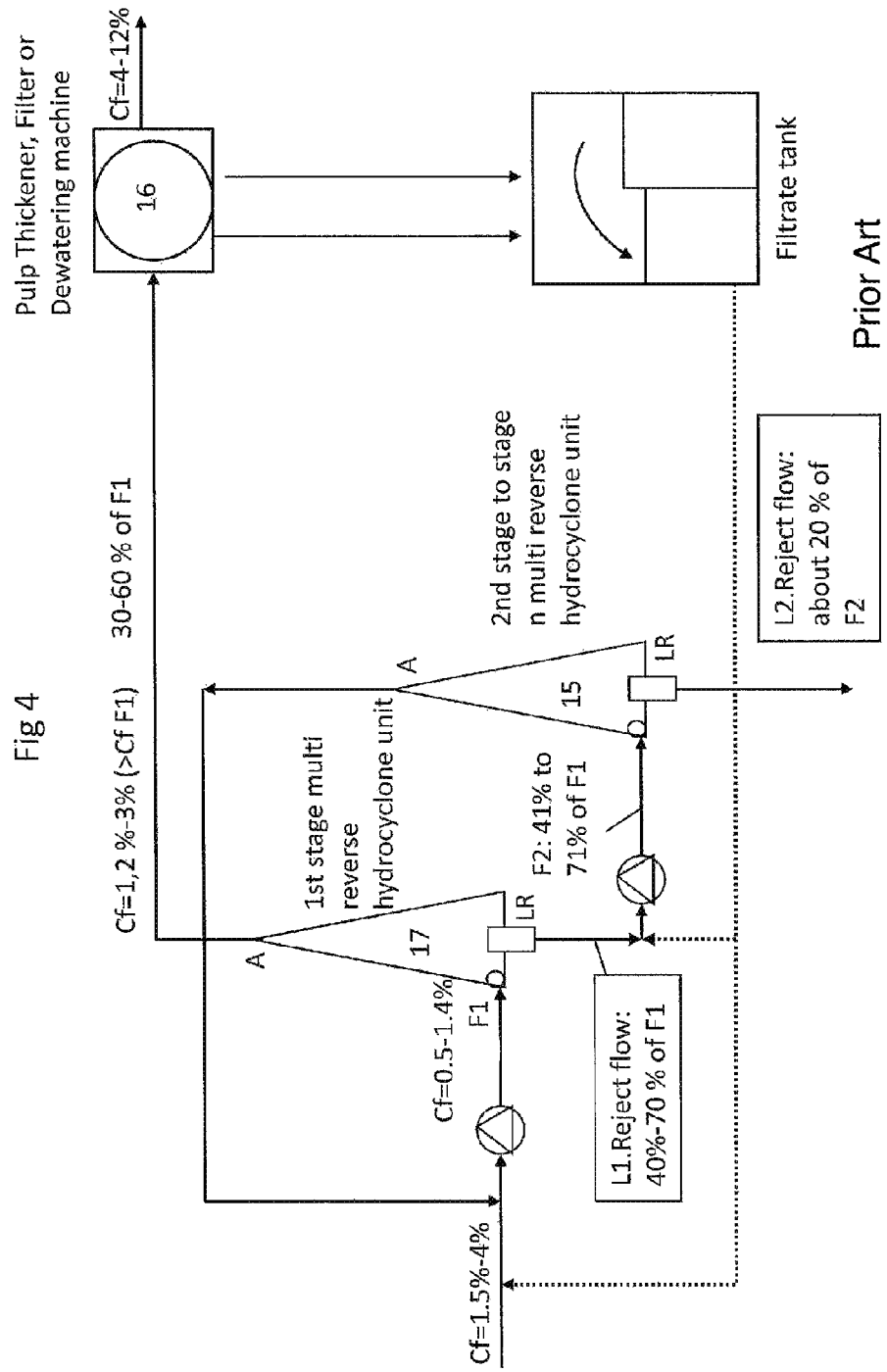

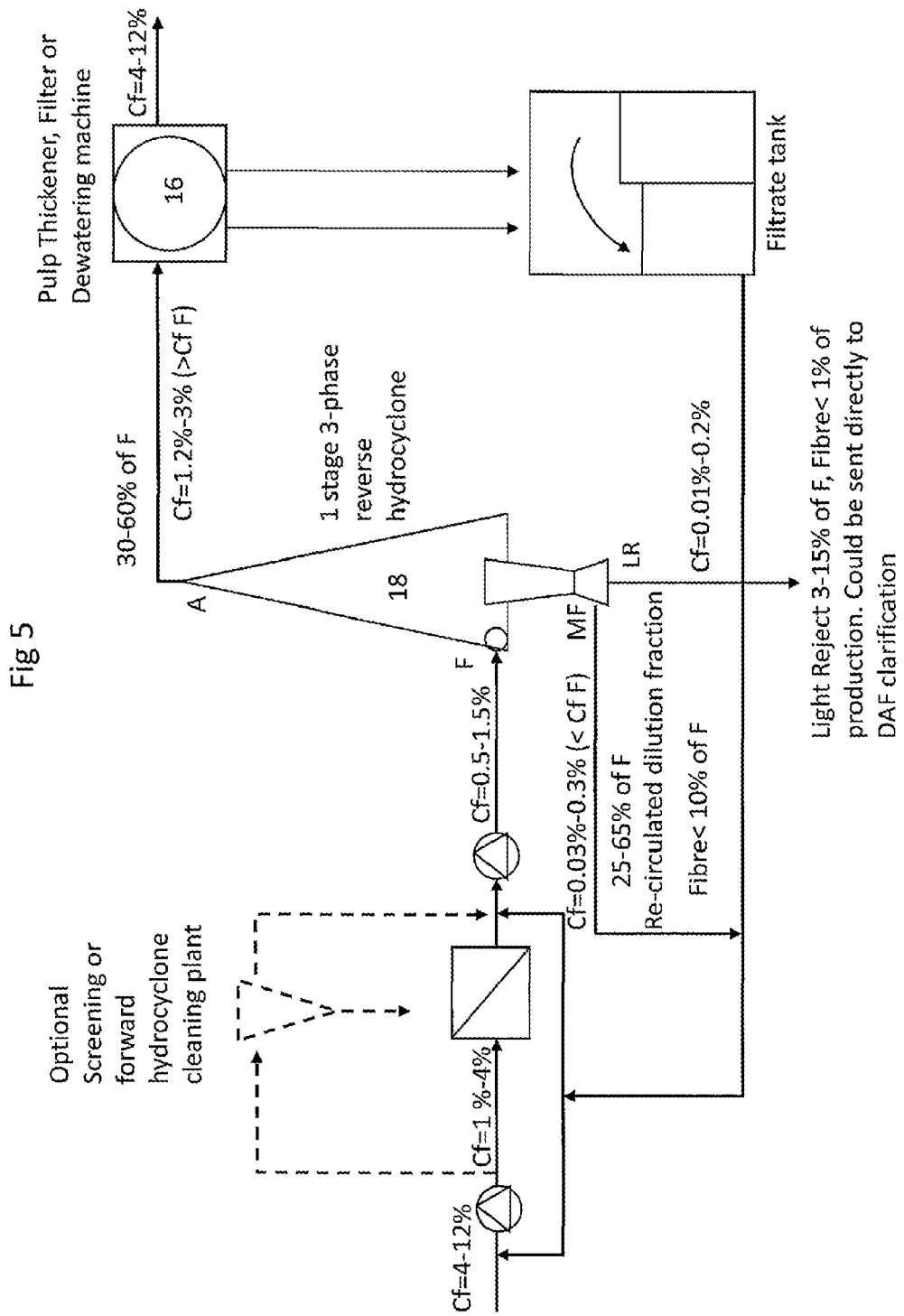

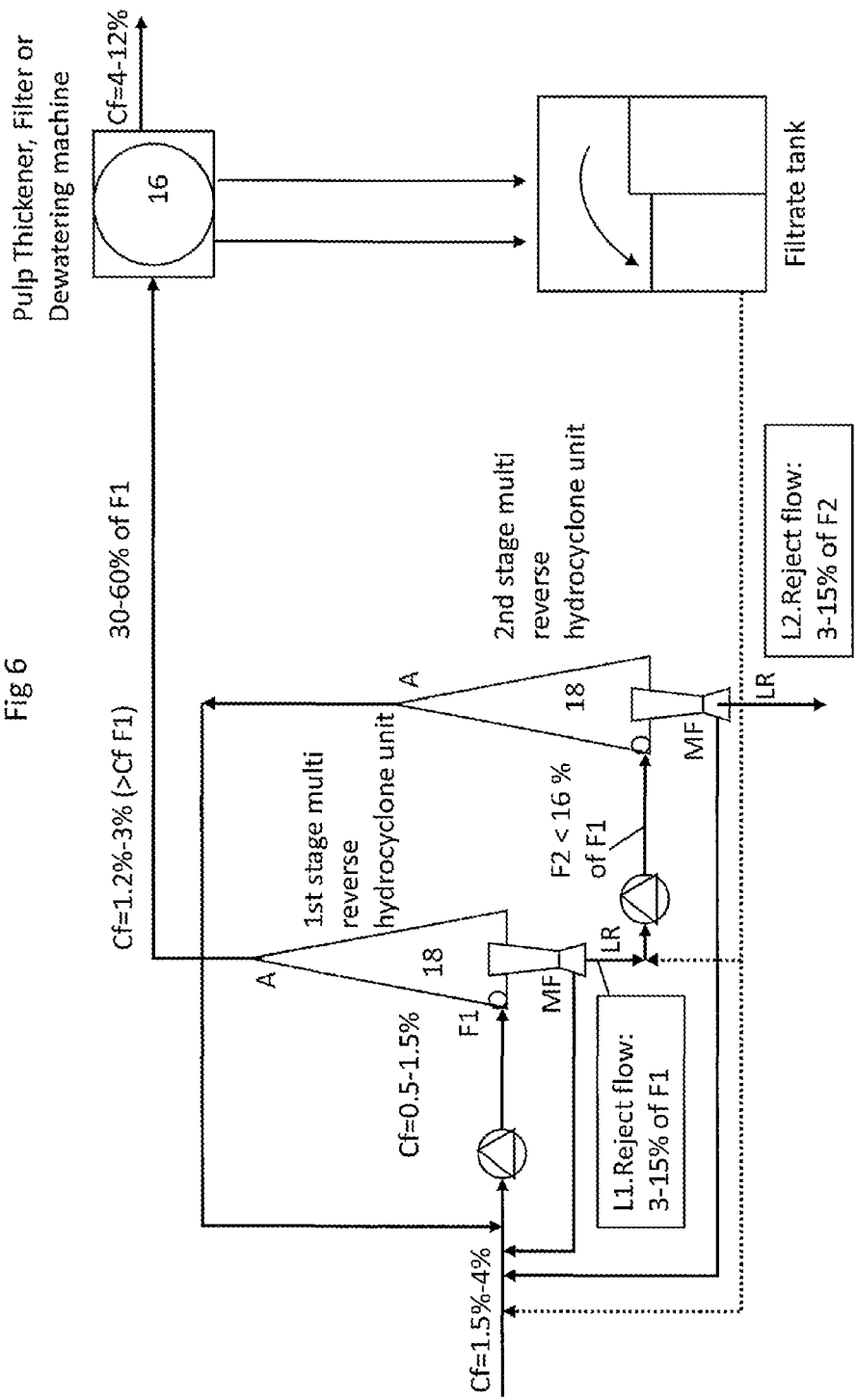

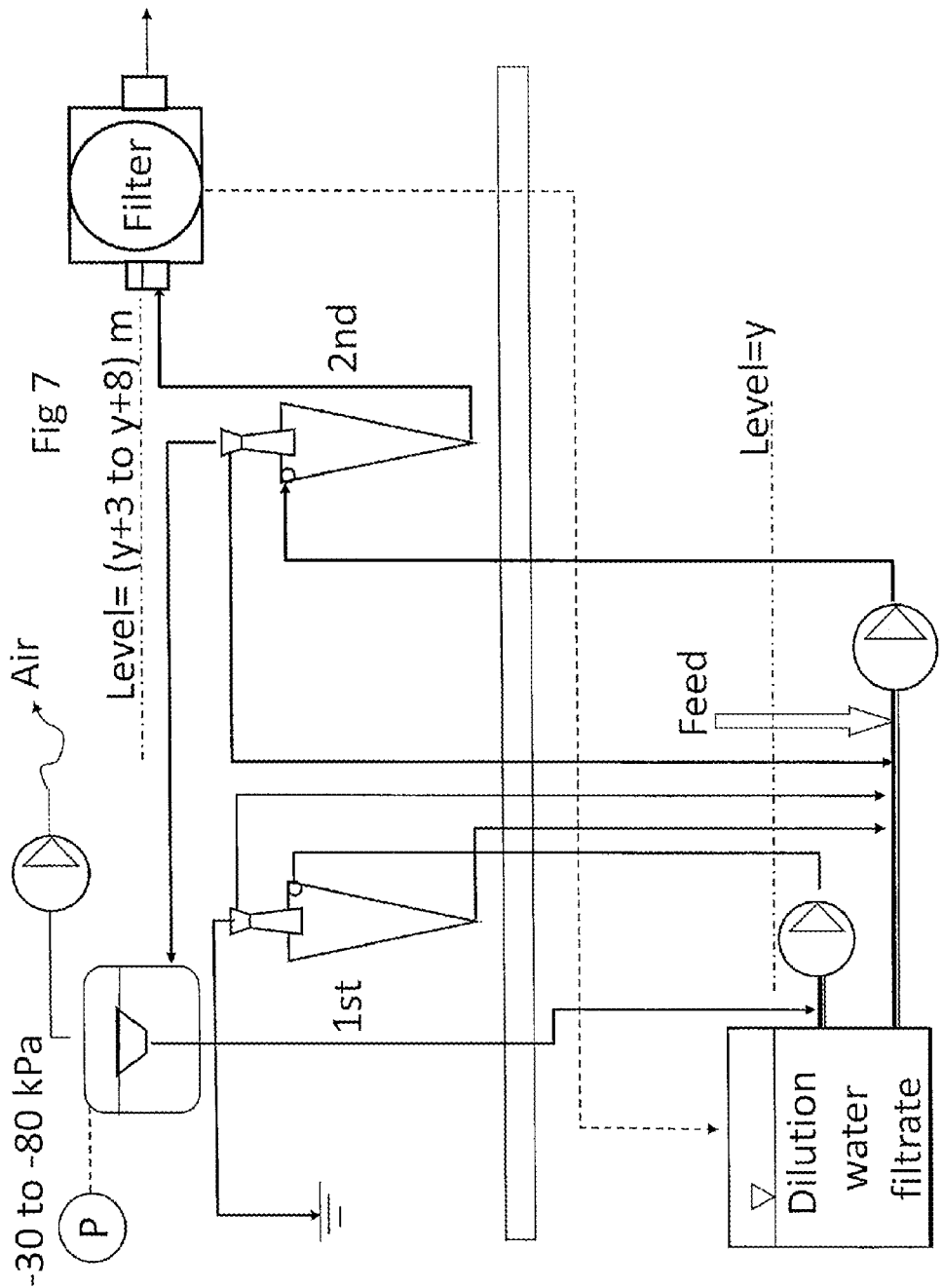

METHOD FOR CLEANING CELLULOSE SUSPENSIONS

BACKGROUND

The present invention concerns a hydrocyclone, system and method for cleaning cellulose suspensions.

BACKGROUND ART

Hydrocyclones are used in pulp and paper industry for removal of impurities. For removal of heavy impurities a so called forward hydrocyclone is used and for removal of low density or light weight impurities such as plastic particles, waxes, resin etc, a reverse hydrocyclone is used. A definition of low density particles is particles having lower or equal density compared with the processed liquid.

Generally a hydrocyclone comprises a base end and an apex end and a separation chamber having an elongated shape between the base end and the apex end. At least one inlet for feeding cellulose suspension to be cleaned is arranged at the base end, at least one underflow outlet is arranged at the apex end and at least one overflow outlet is arranged at the base end. In a reverse flow hydrocyclone, an inlet flow primarily fed tangentially into the separation chamber will be separated into an accept fraction leaving the reverse hydrocyclone from the underflow outlet and a low density reject fraction leaving the reverse hydrocyclone from the overflow outlet. The accept fraction is usually sent forward in the system for downstream processing or further dewatering or to a pulp drying device. The reject fraction from the primary hydrocyclone stage is normally concentrated in several cascade coupled fibre and water recovery stages.

The present hydrocyclone system solutions for reverse cleaning are usually using three types of hydrocyclone designs, see FIG. 1a-c.

In FIG. 1a one type of reverse hydrocyclone is shown, called a through flow or parallel flow reverse hydrocyclone. Those hydrocyclones have a benefit of low volumetric light reject flow LR, typically below 10% of the inlet feed flow, but they have a disadvantage that they do not thicken the accept fraction A in any extent. The inlet feed flow is denoted F.

In FIG. 1b a standard reverse hydrocyclone is shown. It has light reject fraction flow LR in the overflow outlet about 20% by volume of the inlet feed flow F, which is about 10% of the fibre fraction in the inlet feed flow F. This reverse hydrocyclone has a moderate thickening of the accept fraction A and normally needs more fibre recovery stages than a parallel flow reverse hydrocyclone according to FIG. 1a.

In FIG. 1c a thickening or dewatering type of reverse hydrocyclone is shown. Such a hydrocyclone has improved thickening compared to the type of FIG. 1b and also removes light impurities. The accept fraction at the apex end is thickened 1.5-3 times by removing light impurities and water in the overflow fraction. A typical flow split is 30-60% by volume of the inlet flow to the apex end and about 90% by weight of the fibre flow. The light reject fraction is 70-40% of the inlet flow and depending on the split of the flow, contains about 10% of the fibre fraction.

To handle higher flow rates the hydrocyclones are often connected in parallel mounting in multi hydrocyclone aggregates.

When considering the process costs not only fibre concentration and pressure demands for the process in the primary stage is to be taken into consideration, but also the pumping needs for the fibre recovery stages. In many cases the reverse hydrocyclones are arranged downstream, following a forward cleaning multiple hydrocyclone aggregate plant designed for removal of heavy particles. In order to obtain the best efficiency, especially for small light particles, the fibre concentration in the feed of the reverse hydrocyclones needs in many cases be below 1%.

Therefore, it is a common need to dewater the reverse hydrocyclone accept fraction back up to a suitable pumping fibre concentration of 3-6% after the reverse cleaning stage. A vacuum drum or disc filter is commonly used for this purpose when the reverse hydrocyclones are installed in a system for processing of cellulose suspension. In some cases the hydrocyclone plant is located directly connected at an inlet box on a pulp drying device or a paper machine. In these cases the fibre concentration needs for feeding the inlet box is commonly desired to be in the range of 1.6 to 2.5%. At this elevated fibre concentration at least one reverse hydrocyclone can be used in front of the inlet box for thickening the accept fraction to the desired fibre concentration. An example of such a system is described in WO91/05912.

FIG. 3 is showing a prior art two stage standard system using standard reverse hydrocyclones 15 according to FIG. 1b. The hydrocyclones 15 are cascade coupled so the second stage is recovering the reject from the primary stage. The final reject flow to the sewers or water clarification plant from such two stage system is about 4% of the feed flow to the primary stage. The flow to the filter is 80% of the feed flow to the primary stage. Thus the hydrocyclones 15 does not reduce the dewatering needs on a following thickening device 16. The fibre concentration Cf in the feed flow to the primary stage is generally 0.5-1.4% and Cf in the accept 0.6-1.6% after the primary stage. Generally the fibre concentration in the reject is about 0.05-0.14% after the primary stage.

FIG. 4 is showing a two stage system of reverse hydrocyclones 17 of thickening type according to FIG. 1c. For comparison the same type of secondary stage hydrocyclones 15 as in the system in FIG. 3 are installed, i.e. of the type according to FIG. 1b. Alternatively, the secondary stage may be provided with reverse hydrocyclones according to FIG. 1a. The primary reverse hydrocyclone stage 17 thickens the accept to a fibre concentration of 1.5-3 times the feed concentration of the first stage. The fibre concentration Cf in the feed flow to the primary stage is generally 0.5-1.4% and Cf in the accept 1.2-3% after the primary stage. The flow to the following dewatering device 16 is reduced to 30 to 60% of primary hydrocyclone 17 feed flow. The size of the secondary recovery stage 15 is then depending of the needs for reduction of flow to the dewatering device 16. As an example if the there is a need to vary the flow to the dewatering device 16 between 30 to 60%, the secondary reverse hydrocyclone stage 15 need to be able to be sized to handle up to 70% of the primary stage feed flow. Thus it is advantageous to use other types of reverse hydrocyclones for the second stage, such as the types shown in FIGS. 1a and 1b, so the final reject flow decreases from the high level from the primary stage. In the example a reverse hydrocyclone 15 of the type in FIG. b is used and the final reject flow is about 20% of the second stage feed flow. That is between 8-14% of the primary stage feed flow. Compared to the system shown in FIG. 3 this is a lot of residual flow in the reject and it is probably necessary to add another recovery stage to reduce the flow to desired sewer loss. Cf in the final reject is about 0.05%. It may vary depending on fiber type. As a consequence, this type of systems is highly pumping energy demanding.

SUMMARY OF THE INVENTION

The invention concerns, for example, an improved hydrocyclone design, which combines thickening/dewatering of cellulose suspension and efficient removal of light impurities at low reject flow rates. The invention also concerns a system solution using the hydrocyclone design. This system solution is especially suited for applications, where there is a need for light impurities removal, accept fraction thickening and upstream dilution at the same time. Additionally, the invention concerns a method of cleaning a cellulose suspension from at least light impurities.

In forward cleaning, i.e. cleaning of heavy impurities there are known core bleed forward cleaners, see FIG. 1d, which have a central core bleed pipe in the accept vortex finder pipe installed. About 10% by volume and 3-5% by weight of the inlet feed flow is removed as light reject from the central core. Normally these cleaners are known to have moderate efficiency on the light reject fraction and the accept stream is not thickened in any substantial extent.

The hydrocyclone according to the invention is, according to the previous description, of a core bleed type but used in reverse cleaning of cellulose suspension for the first time. The hydrocyclone design that solves this matter has at least one inlet feed flow F and three outgoing separated flow fractions, namely an underflow accept fraction A, an overflow fraction, also called middle fraction MF and a light reject fraction LR, see FIG. 2a. We can call it a three-phase reverse hydrocyclone.

I.e., the fractions are:

F: Feed flow entering the hydrocyclone.

A: A preferably thickened accept fraction in the underflow in ranges of 30-60% of the feed flow.

LR: A light reject fraction taken out in the central core of the overflow fraction in the range of 3-15% of the feed flow.

MF: A middle fraction consisting of 25-65% of the feed flow taken out coaxially with the light reject fraction in the overflow that contains mainly water and some fibers.

One of the differences is a middle fraction that contains mostly water and only a minor amount of fibres. This result was invented when examining a hydrocyclone with relatively long cones with small cone angles, combined with a hydrocyclone design having an inlet "swirl chamber" with relatively big base diameter, D, for a reverse hydrocyclone. It was also an advantage due to the invention that it was possible to get high separation probability of fibers to the underflow outlet and at the same time possible to increase the diameter of the overflow outlet pipe (vortex finder). The diameter on the vortex finder entering the separation body or chamber could then be increased to the extent so that a second light reject overflow pipe (vortex finder) could be arranged preferably concentric with the central length axis of the hydrocyclone.

Fraction A is normally sent forward in the system for downstream processing or further dewatering or to a pulp drying device.

Fraction LR is sent to a secondary reverse stage, a screen, internally or externally in relation to the system located water cleaning stage. The water cleaning could be done with for example dissolved air flotation (DAF).

Fraction MF is in the basic system re-circulated for dilution needs in the process line. In the most cases the need is upstream said hydrocyclone plant.

Advantage: The inventive system has a high thickening factor and a low reject rates and at the same time a high efficiency. The recovery stages do not need to be designed for the fully dewatered liquid, i.e. the fraction of liquid residual due to the thickening of the accept fraction, since a large amount is taken out as an overflow fraction MF, and only a small amount is left at the reject flow, thus total energy is saved. It also improves the flexibility to operate the primary hydrocyclone stage when the system design is independent of the accept thickening needs. The high thickening factor reduces the dewatering surface needs on downstream filter/dewatering equipment.

Obviously, it is possible to add process stages to the inventive systems in different positions, upstream and downstream the hydrocyclone stage/s, without leaving the inventive idea of the system according to the scope of the claims.

BRIEF DESCRIPTION OF THE DRAWINGS

The present invention will now be described in more details by means of examples of embodiments and under reference to the drawings, in which:

FIG. 2a shows a first embodiment of a new type of reverse hydrocyclone,

FIG. 2b shows a second embodiment of a new type of reverse hydrocyclone,

FIG. 2c shows a third embodiment of a new type of reverse hydrocyclone,

FIG. 2d shows a detail of the second embodiment,

FIG. 3 shows a prior art reverse system,

FIG. 4 shows a prior art reverse thickening system,

FIG. 5 shows a new reverse system using a new reverse hydrocyclone,

FIG. 6 shows a new two stage reverse system using a new reverse hydrocyclone, and FIG. 7 shows a new under-pressure reverse system using at least one new reverse hydrocyclone.

DETAILED DESCRIPTION OF EMBODIMENTS OF THE PRESENT INVENTION

Figure 1A:
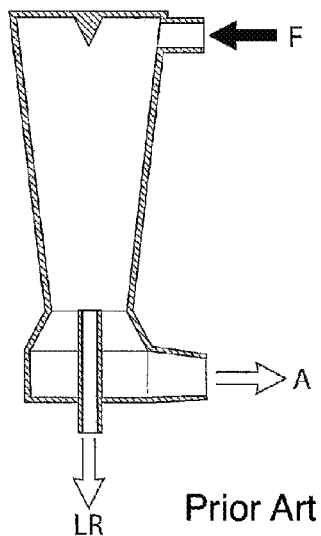
FIG. 1a shows a parallel flow reverse hydrocyclone of prior art.

In FIG. 2a a first embodiment of a new reverse hydrocyclone is shown. The hydrocyclone comprises a separation body or chamber 1 divided into at least two zones: an inlet swirl chamber 2 and an underflow separation chamber 3. Additionally, an overflow separation chamber 4 which is an extension of the vortex finder 12 enters into the inlet swirl chamber end, i.e. the base end 8. The feed flow F to the separation body, enters near the base end 8 of the hydrocyclone, in at least one but preferable at least two substantially tangentially oriented inlet openings 5, 6. The swirl chamber diameter D at the base end 8, is suggested to be at least 60 mm, preferable between 60 to 180 mm, and most preferred between 90 to 140 mm for most applications.

The transition diameter Dt between the inlet swirl chamber 2 and the underflow separation chamber 3 could be located at the location, where the cone angle abruptly changes between the swirl chamber 2 and the underflow separation chamber 3. Dt is preferably between 0.35*D to 0.7*D. The length from the base end to the transition diameter Lt is preferably between 0.8*D to 3.5*D.

The swirl chamber 2 may comprise two zones where the first zone may have approximately a cylindrical shape 9 where the second zone 10 have a steeper wall angle before the transition diameter Dt. But a smoother continuously curved chamber is preferred, as shown in the second and third embodiment, respectively, in FIGS. 2b and 2c. In those cases the transition diameter Dt is defined where the line crossing the outer corner base end 8 diameter D and tangent point on the curve defining the wall of the separation body 1, as shown in FIG. 2d.

The underflow separation chamber 3 could have one cone angle along the whole length, but preferably it has several portions of different cone angles or slightly variable and continuously decreasing cone angle towards the underflow outlet 11. The total length L is defined as the length from the roof of the base end (8) to the underflow outlet 11. The length L is at least 10*D but preferably 14*D to 20*D.

The underflow outlet 11 for the Accept fraction A has an opening area Au between 0.2*Ao to 1.5*Ao, where Ao is the vortex finder overflow area. The overflow separation chamber 4 has a vortex finder diameter Do between 0.17*D to 0.37*D.

At the other end of the overflow separation chamber 4 a second overflow pipe 13 for the light weight reject fraction LR is located coaxially with the overflow separation chamber 4. The pipe 13 has a diameter between 0.25*Do to 0.4*Do. At the outlet of the overflow separation chamber 4 there could be a diffuser section 14 with increased cross sectional area, and an outlet 15 for the middle fraction MF.

FIG. 5 shows an example of a system with only one reverse cleaning stage with at least one inventive three-phase reverse hydrocyclone 18 connected in series with an optional downstream located pulp thickener 16, filter 16 or dewatering device 16. Upstream the three-phase reverse hydrocyclone stage 18 there may be an optional forward hydrocyclone cleaning stage, or screening, flotation or other low consistency operation device installed. This example shows that for smaller pulp lines it is possible to run only one stage of the three-phase reverse hydrocyclone 18 according to the invention. Depending on the installation position, the feed flow may enter from a high density storage tower at 10-12% or a blend chest at 4-5%. The to the system incoming cellulose suspension is primarily diluted to preferred forward hydrocyclone consistency of 0.8-2% fibre concentration or screening consistency of 1-4% fibre concentration range depending on screen type. After screening the cellulose suspension it is diluted to the consistency defined by the efficiency need for the reverse hydrocyclone 18. Normal range is 0.5% to 1.5% fibres in the feed flow.

The accept fraction A in the underflow is thickened to a consistency 1.5 to 3.3 times the feed consistency depending on the set flow split of the middle fraction MF in the overflow. Generally, the fibre concentration is 1.2-3%. The middle fraction MF exiting from the overflow is 25 to 65% of feed flow to the hydrocyclone stage. Pilot test have verified the fibre flow amount of this fraction to be below 10% of the fibres of the feed flow. This fraction is then suitable to use for upstream dilution purposes. The core bleed light reject fraction is 3-15% of the feed flow, preferable below 10% of the volume of the feed flow, and contains in most of the cases less than 1% of the fibres in the feed flow. If the system has, for instance a dissolved air flotation unit (DAF) for water cleaning, it is possible to send this flow to the DAF without any secondary hydrocyclone cleaning stage.

Figure 1B:
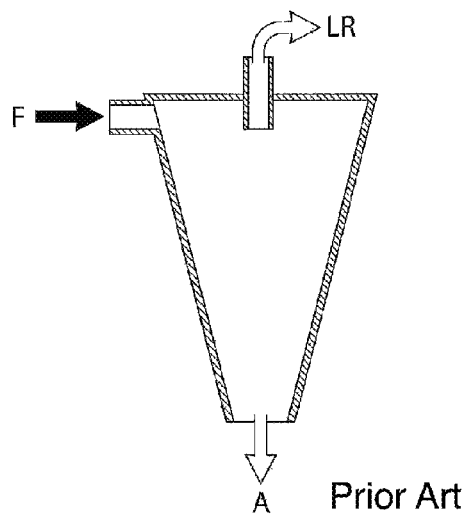
FIG. 1b shows a standard reverse hydrocyclone of prior art.
Figure 1C:
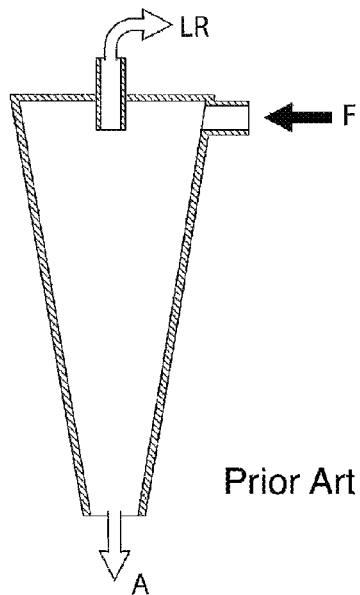
FIG. 1c shows a thickening or dewatering reverse hydrocyclone of prior art.
Figure 1D:
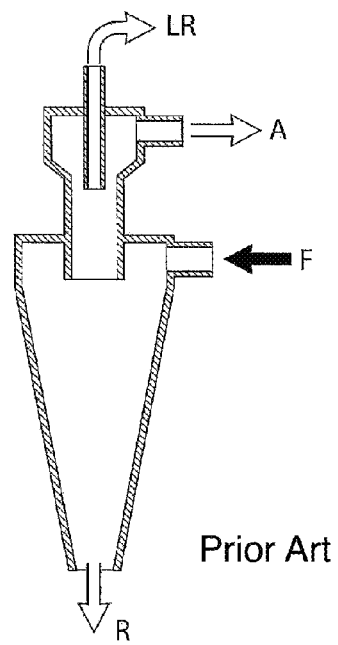
FIG. 1d shows a core bleed forward hydrocyclone of prior art.

FIG. 6 shows a two stage cascade coupled system using at least one reverse hydrocyclone 18 according to the invention in the primary stage. The secondary reverse hydrocyclone stage is in the example showing a similar type of three-phase hydrocyclone 18 as in the primary stage. However it could also be possible with any type of low reject reverse hydrocyclones in the recovery stages (for example of the types previously described in FIGS. 1a and 1b). Here could be seen the benefit compared with a hydrocyclone thickening system shown in FIG. 3. The size of the secondary stage is independent of the flow split adjusting the thickening needs to dewater the pulp further in the thickener or dewatering device 16.

The fibre concentration is 0.5-1.5% in the feed flow of the primary stage and the fibre concentration in the accept flow from the primary stage is 1.2-3%. The fibre concentration of the overflow fraction MF in the primary stage is 0.03-0.3%, which is less than 10% of the fibres in the feed flow. The fibre concentration of the light reject LR of the primary stage is 0.01-0.2%, which is less than 1% of the fibres in the feed flow. The final sewer loss, after the secondary step, could range between 0.1% to 2.4% of the volume of the primary stage feed flow, but is expected to always be below 1% of feed flow in the primary stage. The fiber loss in the second stage is here negligible.

Obviously, it is possible to further add process steps to the systems explained above in referral to FIGS. 5 and 6 in different places without leaving the inventive idea of the system. For example, it would be possible to arrange a forward hydrocyclone cleaning stage downstream the accept flow line before any dewatering device.

FIG. 7 shows an example of an alternative installation of the inventive three phase reverse hydrocyclone for removal of lightweight contaminants according to FIG. 5 or 6. The benefit with this solution is to save pumping energy by lowering the pressure level needed to operate the hydrocyclone separator.

The system layout utilizing the optimal pressure settings needed for hydrocyclone operation and level differences that occur in a typical pulp process line. Valves may be needed to be installed to control the flow splits, but an optional layout will minimize the need to throttle the primary stage main pump flow line, where the highest pumping energy is consumed.

The thickened accept is sent to a filter that normally can be installed 4-8 meter above the filtrate tank level. The middle fraction (MF) is re-circulated back for dilution in front of the primary stage feed pump or another position upstream the reverse hydrocyclone system according to earlier descriptions. To achieve acceptable amount of light reject flow, the need for accept pressure in hydrocyclone stage 1 may be 30-60 kPa and light reject (LR) pressure in the overflow fraction may be at 90-120 kPa below said underflow accept pressure. The obtainable under pressure at the hydrocyclone light reject outlet is depending on the hydrocyclone light reject overflow installation level and separation tank installation level relative filtrate tank level.

The reject fraction of about 10% of the primary feed flow is preferable connected to an air separation tank, where the pressure, using a vacuum pump is kept at a pressure at about −30 kPa to −80 kPa relative to atmospheric pressure or alternately down to the liquid boiling pressure at system temperature.

The overflow from the separation tank is preferable sent to further treatment down to the suction of the feed pump of secondary recovery stage or to a water clarification stage, for instance a DAF unit. FIG. 7 showing an example using a secondary stage of equal type of three phase reverse hydrocyclone separator but the secondary stage may alternatively comprise any type of reverse hydrocyclone.

The present invention has been described by means of embodiments but is not restricted to these but may be varied within the scope of the following claims.

The invention claimed is:

1. A method for producing or treating cellulose suspension by means of cleaning the cellulose suspension from light impurities in a reverse cleaning stage, the method comprising the steps of:

cleaning the cellulose suspension from light impurities by means of at least one hydrocyclone for reverse cleaning cellulose suspensions from light impurities, the hydrocyclone including a base end and an apex end and a separation chamber having an elongated shape between the base end and the apex end, at least one net arranged at the base end and at least one underflow outlet at the apex end and at least one overflow outlet at the base end, the overflow outlet being provided with an additional, light reject outlet arranged concentrically to a length axis of the hydrocyclone, the underflow outlet at the apex end producing a thickened accept fraction, the light reject outlet producing a light reject fraction taken out in a central core of the overflow outlet, and the overflow outlet at the base end producing a middle fraction and taken out coaxially with the light reject fraction in the overflow outlet, and diluting the cellulose suspension upstream of the hydrocyclone with all of the middle fraction from the overflow outlet.

2. A method according to claim 1, wherein the hydrocyclone is positioned in a primary cleaning stage.

3. A method according to claim 2, wherein a light reject fraction from the hydrocyclone of the primary cleaning stage is lead to a secondary cleaning stage comprising another hydrocyclone.

4. A method according to claim 1, wherein the cellulose suspension is cleaned in at least one of a forward cleaning stage, a screening stage and a flotation stage.

5. A method according to claim 1 wherein the hydrocyclone has a strongly decreasing cross sectional diameter for a first portion of its length from at least near the base end towards the apex end and a slowly decreasing cross sectional diameter for a second portion of its length from a transition between the first portion and the second portion towards the apex end, the transition between the first and the second portions having a diameter Dt, and the relation between the transition diameter Dt and a base end diameter D is between 0.35 and 0.7, the length from the base end to the transition diameter Lt being between 0.8*D to 3.5*D.

6. A method according to claim 5, wherein the hydrocyclone has a total length L defined as the length from a roof of the base end to the underflow outlet, the length L being at least 10*D.

7. A method according to claim 6 wherein the length L is between 14*D and 20*D.

8. A method for producing or treating cellulose suspension by means of cleaning the cellulose suspension from light impurities in a reverse cleaning stage, the method comprising the steps of:

cleaning the cellulose suspension from light impurities by means of at least one hydrocyclone for reverse cleaning cellulose suspensions from light impurities, the at least one hydrocyclone including a base end, an apex end, a separation chamber having an elongated shape between the base end and the apex end, at least one inlet arranged at the base end, at least one underflow outlet at the apex end, at least one overflow outlet at the base end, and a light reject outlet in the overflow outlet and arranged concentrically to a length axis of the hydrocyclone, the underflow outlet at the apex end producing a thickened accept fraction in the range of 30-60% of a feed flow, the light reject outlet producing a light reject fraction taken out in a central core of the overflow outlet in the range of 3-15% of the feed flow, and the overflow outlet at the base end producing a middle fraction in the range of 25-65% of the feed flow, and taken out coaxially with the light reject fraction in the overflow outlet, the middle fraction being mostly water, and diluting the cellulose suspension upstream of the hydrocyclone with all of the middle fraction from the overflow outlet.

9. A method according to claim 8 wherein the hydrocyclone has a strongly decreasing cross sectional diameter for a first portion of its length from at least near the base end towards the apex end and a slowly decreasing cross sectional diameter for a second portion of its length from a transition between the first portion and the second portion towards the apex end, the transition between the first and the second portions having a diameter Dt, and the relation between the transition diameter Dt and a base end diameter D is between 0.35 and 0.7, the length from the base end to the transition diameter Lt being between 0.8*D to 3.5*D.

10. A method according to claim 9, wherein the hydrocyclone has a total length L defined as the length from a roof of the base end to the underflow outlet, the length L being at least 10*D.

11. A method according to claim 10 wherein the length L is between 14*D and 20*D.

* * * * *